(12) United States Patent
Takenaka et al.

(10) Patent No.: US 11,629,481 B2
(45) Date of Patent: Apr. 18, 2023

(54) WORK MACHINE AND METHOD FOR CONTROLLING WORK MACHINE

(71) Applicant: KOMATSU LTD., Tokyo (JP)

(72) Inventors: Yuita Takenaka, Tokyo (JP); Kenichi Yamada, Tokyo (JP)

(73) Assignee: KOMATSU LTD., Tokyo (JP)

(*) Notice: Subject to any disclaimer, the term of this patent is extended or adjusted under 35 U.S.C. 154(b) by 90 days.

(21) Appl. No.: 17/420,157

(22) PCT Filed: Mar. 6, 2020

(86) PCT No.: PCT/JP2020/009838
§ 371 (c)(1),
(2) Date: Jul. 1, 2021

(87) PCT Pub. No.: WO2020/195726
PCT Pub. Date: Oct. 1, 2020

(65) Prior Publication Data
US 2022/0090359 A1 Mar. 24, 2022

(30) Foreign Application Priority Data
Mar. 28, 2019 (JP) .............................. JP2019-062992

(51) Int. Cl.
*B60W 30/188* (2012.01)
*E02F 9/22* (2006.01)
(Continued)

(52) U.S. Cl.
CPC ........... *E02F 9/2253* (2013.01); *B60W 10/06* (2013.01); *B60W 10/10* (2013.01);
(Continued)

(58) Field of Classification Search
CPC .... B60W 10/06; B60W 10/10; B60W 30/188; B60W 30/1888; B60W 2300/17;
(Continued)

(56) References Cited

U.S. PATENT DOCUMENTS

2008/0234902 A1* 9/2008 Johnson ................ E02F 9/2029
701/50
2008/0243345 A1* 10/2008 Knight ...................... E02F 3/84
701/50
(Continued)

FOREIGN PATENT DOCUMENTS

EP 3 858 692 A1 4/2021
JP 2001-113989 A 4/2001
(Continued)

OTHER PUBLICATIONS

The International Search Report for the corresponding international application No. PCT/JP2020/009838, dated Jun. 9, 2020.
(Continued)

*Primary Examiner* — Edwin A Young
(74) *Attorney, Agent, or Firm* — Global IP Counselors, LLP

(57) ABSTRACT

A work machine includes an engine, a travel drive system, a work implement, an apparatus drive system with a hydraulic pump, an accelerator operating member, a work implement operating member, and a controller. The controller controls the apparatus drive system in accordance with an operating amount of the work implement operating member.
(Continued)

The controller determines a target tractive force of the travel drive system based on an operating amount of the accelerator operating member. The controller determines an allowable acceleration of the work machine. The controller determines an upper limit of tractive force of the travel drive system based on the allowable acceleration. The controller corrects the target tractive force so as to be equal to or less than the upper limit when the target tractive force is greater than the upper limit. The controller controls the travel drive system based on the corrected target tractive force.

11 Claims, 8 Drawing Sheets

(51) Int. Cl.
  *B60W 10/06* (2006.01)
  *B60W 10/10* (2012.01)
  *E02F 9/20* (2006.01)
  *E02F 3/28* (2006.01)
(52) U.S. Cl.
  CPC ......... *B60W 30/188* (2013.01); *E02F 9/2066* (2013.01); *E02F 9/2079* (2013.01); *E02F 9/2246* (2013.01); *B60W 2300/17* (2013.01); *B60W 2540/10* (2013.01); *B60W 2710/0666* (2013.01); *B60W 2710/105* (2013.01); *E02F 3/283* (2013.01)

(58) Field of Classification Search
  CPC ..... B60W 2540/10; B60W 2710/0666; B60W 2710/105; E02F 9/2253; E02F 9/2066; E02F 9/2079; E02F 9/2246; E02F 3/283
  See application file for complete search history.

(56) References Cited

U.S. PATENT DOCUMENTS

| | | | |
|---|---|---|---|
| 2011/0318157 A1* | 12/2011 | Okamura | ............... E02F 3/436 701/50 |
| 2012/0185136 A1* | 7/2012 | Ohnuma | ............... B60W 30/04 701/70 |
| 2015/0315767 A1 | 11/2015 | Miyamoto et al. | |
| 2016/0097186 A1 | 4/2016 | Kamada et al. | |

FOREIGN PATENT DOCUMENTS

| | | |
|---|---|---|
| JP | 2005-335925 A | 12/2005 |
| JP | 2015-40422 A | 3/2015 |
| JP | 2015-131606 A | 7/2015 |
| WO | 2014/208614 A1 | 12/2014 |

OTHER PUBLICATIONS

The extended European search report for the corresponding European application No. 20778444.8, dated Sep. 20, 2022.

* cited by examiner

WORK MACHINE AND METHOD FOR CONTROLLING WORK MACHINE

This application is a U.S. National stage application of International Application No. PCT/JP2020/009838, filed on Mar. 6, 2020. This U.S. National stage application claims priority under 35 U.S.C. § 119(a) to Japanese Patent Application No. 2019-062992, filed in Japan on Mar. 28, 2019, the entire contents of which are hereby incorporated herein by reference.

BACKGROUND

Field of the Invention

The present invention relates to a work machine and a method for controlling a work machine.

Background Information

In International Publication WO 2014/208614, a technique is disclosed in which a controller in a work machine determines a target tractive force of a transmission based on an operation of an accelerator operating member. As a result, the operator is able to optionally operate torque for causing the work machine to travel with the accelerator operating member.

In addition, the controller in International Publication WO 2014/208614 determines a required torque of a work implement based on an operation of a work implement operating member: The controller controls the engine based on the target tractive force of the transmission and the required torque of the work implement. As a result, the output of the engine can be increased by only operating the work implement operating member without operating the accelerator operating member. As a result, the work implement can be actuated at a desired speed.

SUMMARY

As indicated above, when the target tractive force is determined based on an operation of the accelerator operating member, a large acceleration force is generated in the work machine when the operator unintentionally performs a large operation. In this case, ride comfort is decreased.

Accordingly, the generation of such a large acceleration force can be suppressed if the output of the engine is limited. However, in this case, the desired required torque of the work implement cannot be obtained and there is a concern that workability is decreased.

In addition, the generation of a large acceleration force can also be suppressed by limiting the upper limit of the target tractive force. However, the work machine is not limited to traveling on flat roads and may be traveling on rough roads or on steep slopes. In addition, the work machine does not only travel on roads but also performs work such as excavating. Therefore, the load on the work machine varies greatly in accordance with the conditions. As a result, if the upper limit of the target tractive force is limited in a uniform manner, a sufficient acceleration force cannot be obtained under the conditions of a large load of the work machine, and there is a concern that travel performance will decrease.

An object of the present disclosure is to suppress a reduction in workability and travel performance while suppressing the generation of an excessive acceleration force in a work machine.

A work machine according to a first aspect comprises an engine, a travel drive system, a work implement, an apparatus drive system, an accelerator operating member, a work implement operating member, and a controller. The travel drive system includes a transmission connected to the engine. The apparatus drive system includes a hydraulic pump driven by the engine. The hydraulic pump discharges hydraulic fluid to be supplied to the work implement. The accelerator operating member receives an operation performed by an operator. The work implement operating member receives an operation performed by the operator.

The controller controls the apparatus drive system in accordance with an operating amount of the work implement operating member. The controller determines a target tractive force of the travel drive system based on the operating amount of the accelerator operating member. The controller determines an allowable acceleration of the work machine. The controller determines an upper limit of the tractive force of the travel drive system based on the allowable acceleration. The controller corrects the target tractive force so as to be equal to or less than the upper limit when the target tractive force is greater than the upper limit. The controller controls the travel drive system based on the corrected target tractive force.

A method according to a second aspect is a control method for controlling a work machine. The work machine comprises an engine, a travel drive system, a work implement, and an apparatus drive system. The travel drive system includes a transmission connected to the engine. The apparatus drive system includes a hydraulic pump driven by the engine. The hydraulic pump discharges hydraulic fluid to be supplied to the work implement. The method comprises the following processes. A first process is acquiring the operating amount of a work implement operating member. A second process is controlling the apparatus drive system in accordance with the operating amount of the work implement operating member. A third process is acquiring the operating amount of an accelerator operating member. A fourth process is determining a target tractive force of the travel drive system based on the operating amount of the accelerator operating member. A fifth process is determining an allowable acceleration of the work machine. A sixth process is determining an upper limit of the tractive force of the travel drive system based on the allowable acceleration. A seventh process is connecting the target tractive force so as to be equal to or less than the upper limit when the target tractive force is greater than the upper limit. An eighth process is controlling the travel drive system based on the corrected target tractive force.

In the present disclosure, the target tractive force is corrected so as to be equal to or less than the upper limit when the target tractive force is greater than the upper limit. As a result, torque for the apparatus drive system can be assured in comparison to when the output of the engine is limited. As a result, a reduction in workability can be suppressed. Moreover, the upper limit of the tractive force of the travel drive system is determined based on the allowable acceleration. As a result, a tractive force for the travel drive system corresponding to the allowable acceleration can be assured. As a result, a reduction in travel performance can be suppressed while suppressing the generation of a large acceleration force.

DETAILED DESCRIPTION OF EMBODIMENT(S)

Figure 1:
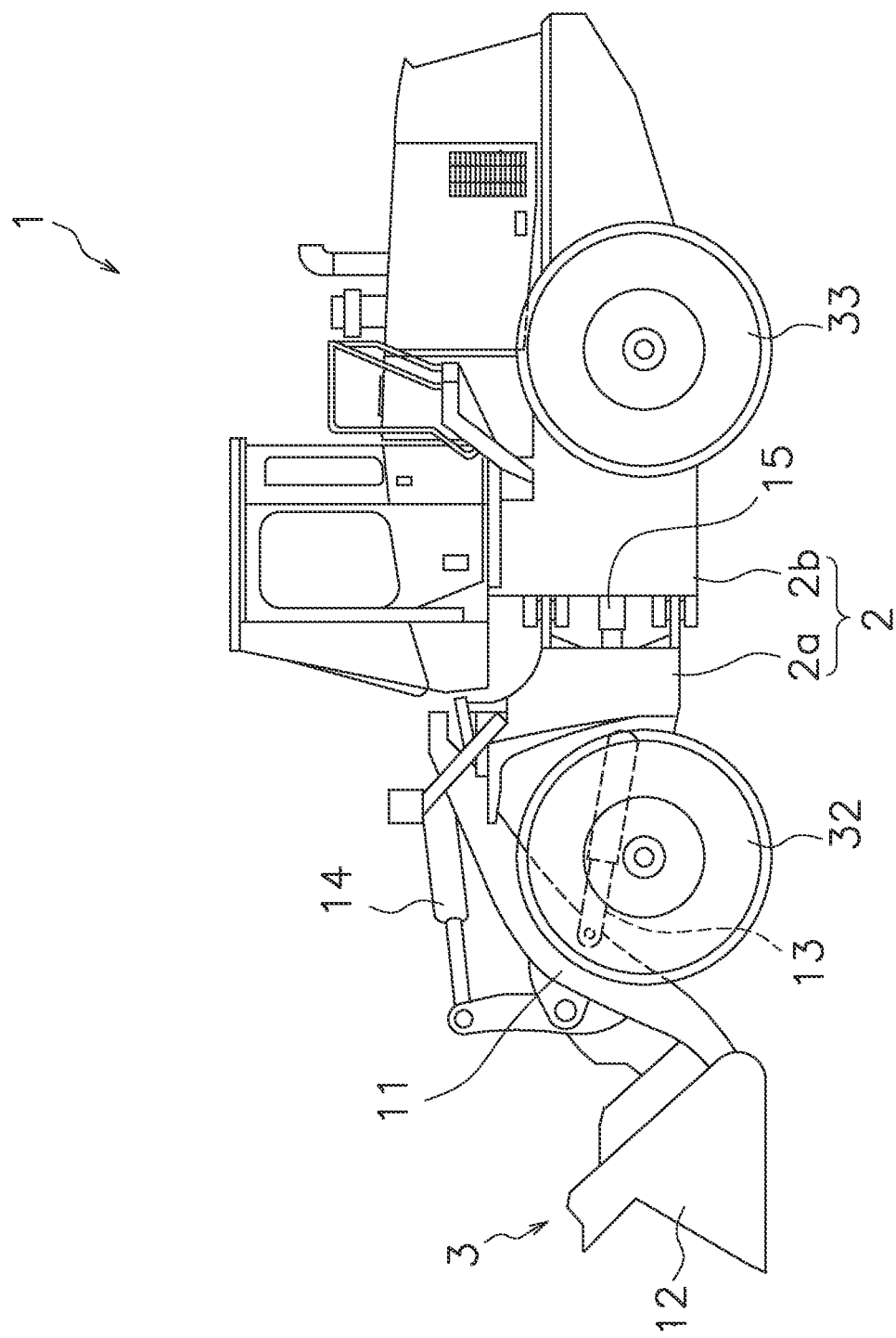
FIG. 1 is a side view of a work machine according to an embodiment.

Embodiments of the present invention will be explained in detail with reference to the figures. FIG. 1 is a side view of a work machine 1 according to an embodiment of the present invention. As illustrated in FIG. 1, the work machine 1 includes a vehicle body 2 and a work implement 3.

The vehicle body 2 includes a front vehicle body 2a and a rear vehicle body 2b. The rear vehicle body 2b is connected to the front vehicle body 2a so as to allow turning to the left and right. The front vehicle body 2a and the rear vehicle body 2b are coupled by a hydraulic cylinder 15. The hydraulic cylinder 15 extends and contracts whereby the front vehicle body 2a turns to the left or right with respect to the rear vehicle body 2b.

The work implement 3 is used for work such as excavation. The work implement 3 is attached to the front vehicle body 2a. The work implement 3 includes a boom 11, a bucket 12, and hydraulic cylinders 13 and 14. The hydraulic cylinders 13 and 14 extend and contract to actuate the boom 11 and the bucket 12.

Figure 2:
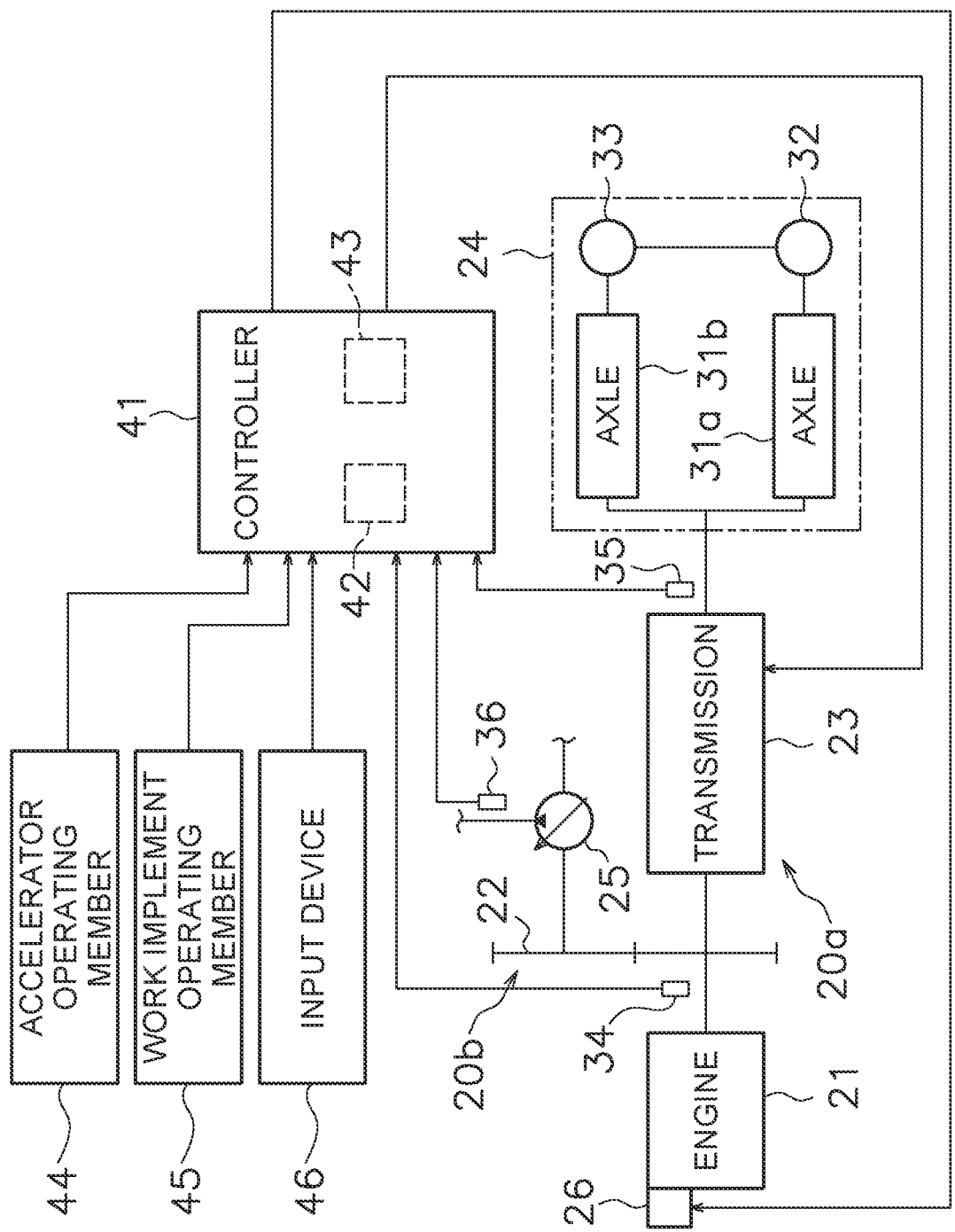
FIG. 2 is a block diagram illustrating a configuration of a drive system and a control system of the work machine.

FIG. 2 is a block diagram illustrating a configuration of a drive system and a control system of the work machine 1. As illustrated in FIG. 2, the drive system of the work machine 1 includes an engine 21, a travel drive system 20a, and an apparatus drive system 20b.

The engine 21 is, for example, a diesel engine. The engine 21 includes a fuel injection device 26. The fuel injection device 26 adjusts the amount of fuel injected into the cylinders of the engine 21 to control the output of the engine 21.

The travel drive system 20a includes a transmission 23 and a travel device 24. The transmission 23 is connected to the engine 21. For example, the transmission 23 may be a hydro-static transmission (HST). However, the transmission 23 may be another type of transmission such as a hydraulic mechanical transmission (HMT) or an electric mechanical transmission (EMT).

The travel device 24 causes the work machine 1 to travel. The travel device 24 includes axles 31a and 31b, front wheels 32, and rear wheels 33. The axles 31a and 31b are connected to the transmission 23. The front wheels 32 are provided to the front vehicle body 2a. The rear wheels 33 are provided to the rear vehicle body 2b. The axles 31a and 31b transmit driving power from the transmission 23 to the front wheels 32 and the rear wheels 33.

The apparatus drive system 20b includes a power take-off (PTC) 22 and a hydraulic pump 25. The PTO 22 distributes the driving power of the engine 21 between the transmission 23 and the hydraulic pump 25. Only one hydraulic pump 25 is illustrated in FIG. 2. However, two or more hydraulic pumps may be connected to the engine 21 via the PTO 22.

The hydraulic pump 25 is connected to the engine 21 via the PTO 22. The hydraulic pump 25 is driven by the engine 21 to discharge hydraulic fluid. The hydraulic fluid discharged from the hydraulic pump 25 is supplied to the aforementioned hydraulic cylinders 13 to 15.

The control system of the work machine 1 includes an engine sensor 34, a vehicle speed sensor 35, and a pump sensor 36. The engine sensor 34 detects the engine rotation speed. The vehicle speed sensor 35 detects the output rotation speed of the travel drive system 20a. The output rotation speed of the travel drive system 20a is, for example, the rotation speed of an output shaft of the transmission 23. However, the output rotation speed may be the rotation speed of another rotating element that is inside the transmission 23 or is positioned downstream of the transmission 23. The pump sensor 36 detects the discharge pressure of the hydraulic pump 25.

The control system of the work machine 1 includes a controller 41. The controller 41 is configured to control the work machine 1. The controller 41 receives a signal indicating the engine rotation speed from the engine sensor 34. The controller 41 receives a signal indicating the output rotation speed from the vehicle speed sensor 35. The controller 41 receives a signal indicating the discharge pressure of the hydraulic pump 25 from the pump sensor 36. The controller 41 transmits instruction signals to the engine 21 and the transmission 23.

The controller 41 includes a processor 42 and a storage device 43. The processor 42 may be a central processing unit (CPU) for example. Alternatively, the processor 42 may be a processor different from a CPU. The processor 42 executes processing for controlling the work machine 1 in accordance with a program. The storage device 43 includes a non-volatile memory such as a ROM and a volatile memory such as a RAM. The storage device 43 may include an auxiliary storage device such as a hard disk or a solid state drive (SSD). The storage device 43 is an example of a non-transitory computer-readable recording medium. The storage device 43 stores programs and data for controlling the work machine 1.

The control system of the work machine 1 includes an accelerator operating member 44, a work implement operating member 45, and an input device 46. The accelerator operating member 44 is operable by an operator for controlling the travel of the work machine 1. The accelerator operating member 44 is, for example, a pedal. However, the accelerator operating member 44 may be another member such as a lever or a switch.

The work implement operating member 45 is operable by an operator for controlling the work implement 3. The work implement operating member 45 is, for example, a lever. However, the work implement operating member 45 may be another member such as a switch or a pedal. The input device 46 is operable by the operator for selecting a control mode of the work machine 1. The input device 46 includes, for example, a touch screen. However, the input device 46 may include another member such as a mechanical switch.

The controller 41 receives a signal indicating an accelerator operating amount from the accelerator operating member 44. The accelerator operating amount is the operating amount of the accelerator operating member 44. The controller 41 receives a signal indicating a work implement operating amount from the work implement operating member 45. The work implement operating amount is the operating amount of the work implement operating member 45.

The controller 41 receives a signal indicating the selection of a control mode from the input device 46. The control mode includes a first mode and a second mode. However, the controller 41 may automatically select a control mode in response to a load applied to the work machine 1.

Figure 3:
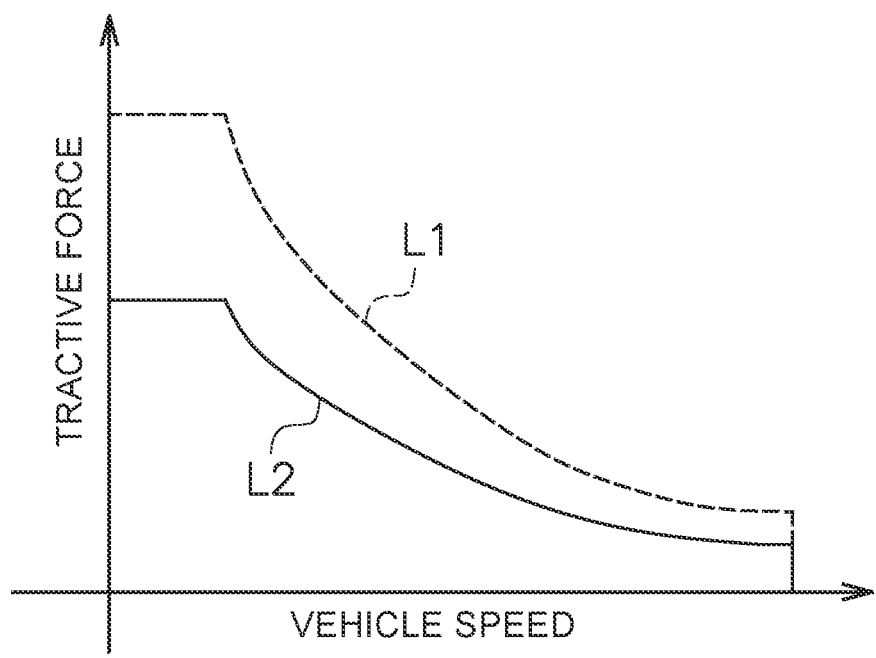
FIG. 3 illustrates an example of tractive force—vehicle speed characteristics.

FIG. 3 illustrates respective tractive force—vehicle speed characteristics of the first mode and the second mode. L1 in FIG. 3 represents the tractive force—vehicle speed characteristics in the first mode. L2 represents the tractive force—vehicle speed characteristics in the second mode. The tractive force—vehicle speed characteristics represent the maximum tractive force at each vehicle speed. As illustrated in FIG. 3, in the second mode, the tractive force of the work machine 1 is limited so as to be smaller than the first mode. The controller 41 controls the engine 21 and the transmission 23 in accordance with the control mode selected from the first mode and the second mode.

Figure 4:
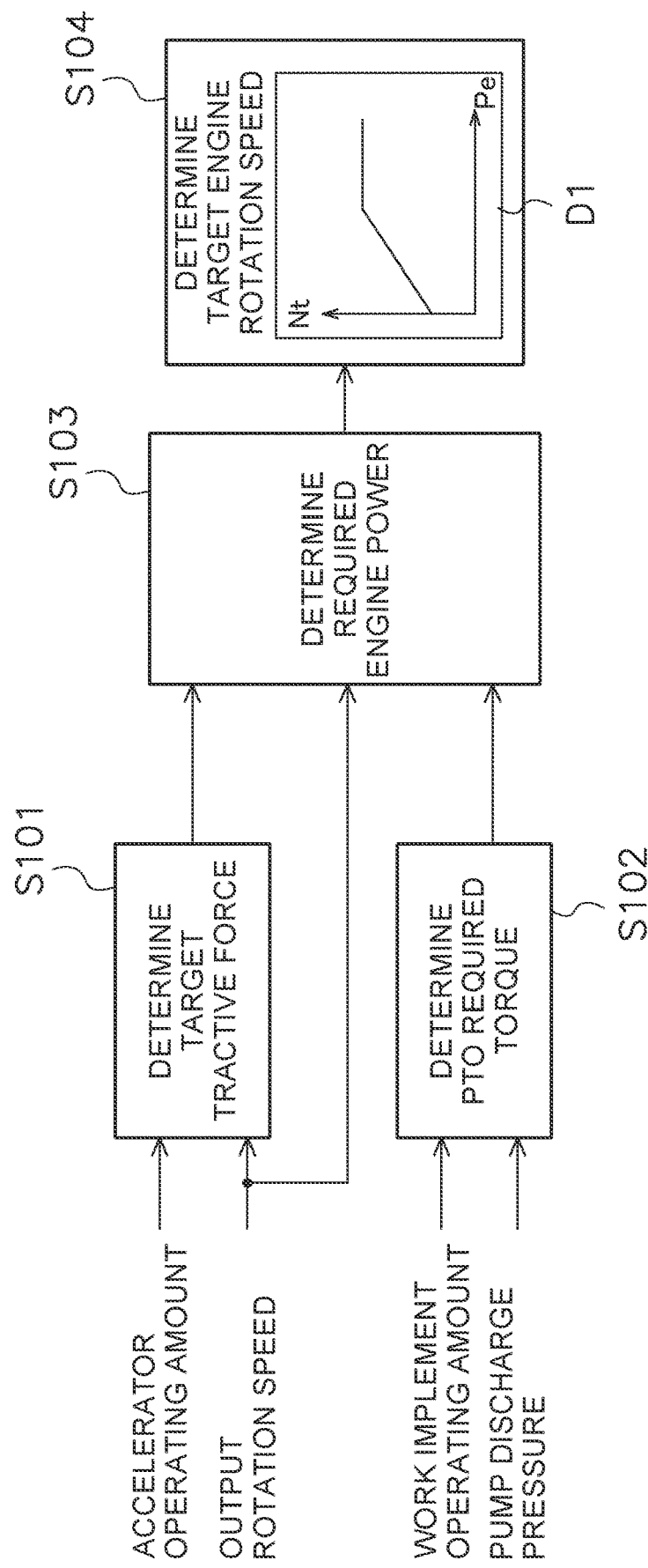
FIG. 4 is a block diagram illustrating processing for controlling the engine.

Processing for controlling the engine 21 and executed by the controller 41 is explained hereinbelow. FIG. 4 is a block diagram illustrating processing for controlling the engine 21. As illustrated in step S101 in FIG. 4, the controller 41 determines a target tractive force of the travel drive system 20a. The controller 41 determines the target tractive force mainly from the accelerator operating amount and the output rotation speed. A method for determining the target tractive force is explained in detail below.

The tractive force of the travel drive system 20a corresponds to the output torque of the travel drive system 20a. The tractive force of the travel drive system 20a and the output torque of the travel drive system 20a are mutually convertible. Therefore, the tractive force in the following explanation can also be referred to as the output torque.

In step S102, the controller 41 determines a PTO required torque. The PTO required torque is the required torque of the apparatus drive system 20b. In other words, the PTO required torque is the required torque of an apparatus connected to the engine 21 via the PTO 22. The controller 41 determines the PTO required torque from the work implement operating amount and the discharge pressure of the hydraulic pump 25. The PTO required torque includes the required torque of the hydraulic pump 25. For example, the controller 41 determines a required flow rate of hydraulic fluid from the work implement operating amount. The controller 41 determines the PTO required torque from the required flow rate and the discharge pressure. If two or more hydraulic pumps are connected to the engine 21 via the PTO 22, the PTO required torque may further include the required torques of the other hydraulic pumps.

In step S103, the controller 41 determines a required engine power. The required engine power is the required horsepower of the engine 21. The controller 41 determines the required engine power from the PTO required torque and the target tractive force. For example, the controller 41 determines the required engine power from the sum of the PTO required torque and the target tractive force.

In step S104, the controller 41 determines a target engine rotation speed. The controller 41 determines the target engine rotation speed from the required engine power. For example, the controller 41 stores target engine rotation speed data D1. The target engine rotation speed data D1 prescribes a relationship between the required engine power Pe and the target engine rotation speed Nt. The controller 41 refers to the target engine rotation speed data D1 and determines the target engine rotation speed Nt from the required engine power Pe.

The controller 41 determines an instruction to the fuel injection device 26 in response to the target engine rotation speed determined as described above. Consequently, the output of the engine 21 is controlled so that the target tractive force and the PTO required torque are attained. The controller 41 may also determine the target torque of the engine 21 from the PTO required torque and the target tractive force. The controller 41 may control the engine 21 based on the target torque of the engine 21.

Figure 5:
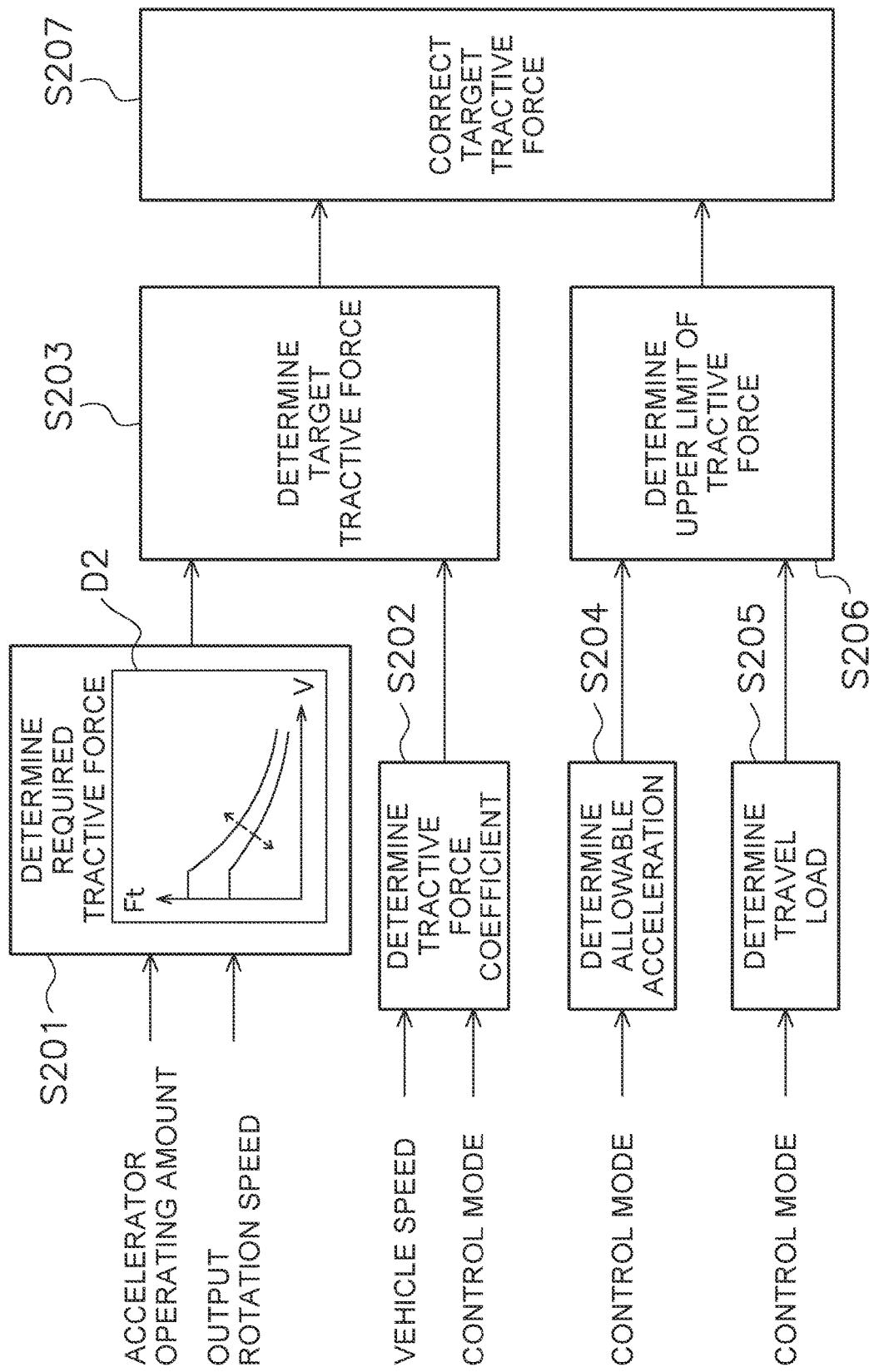
FIG. 5 is a block diagram illustrating processing for determining a target tractive force.

Processing for determining the target tractive force is explained next. FIG. 5 is a block diagram illustrating processing for determining the target tractive force. As illustrated in step S201 in FIG. 5, the controller 41 determines the required tractive force of the travel drive system 20a. The controller 41 determines the required tractive force from the accelerator operating amount and the output rotation speed. For example, the controller 41 stores required tractive force data D2. The required tractive force data D2 prescribes a relationship between the vehicle speed V and the required tractive force Ft. The required tractive force data D2 is changed in accordance with the accelerator operating amount. The controller 41 calculates the vehicle speed from the output rotation speed. The controller 41 refers to the required tractive force data D2 and determines the required tractive force from the accelerator operating amount and the vehicle speed.

Figure 6:
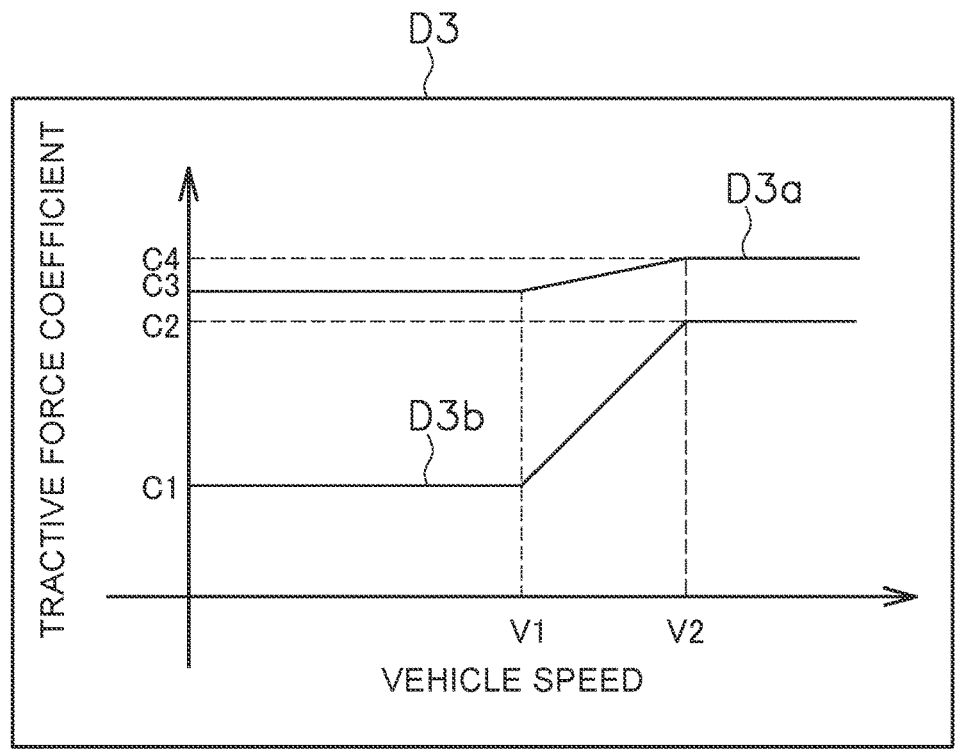
FIG. 6 illustrates an example of coefficient data.

In step S202, the controller 41 determines a tractive force coefficient. The controller 41 determines the tractive force coefficient from the vehicle speed and the control mode. For example, the controller 41 stores coefficient data D3 illustrated in FIG. 6. The coefficient data D3 prescribes a relationship between the vehicle speed and the tractive force coefficient. The coefficient data D3 includes first coefficient data D3a and second coefficient data D3b. The first coefficient data D3a prescribes the relationship between the vehicle speed and the tractive force coefficient in the first mode. The second coefficient data D3b prescribes the relationship between the vehicle speed and the tractive force coefficient in the second mode.

In the first coefficient data D3a, the tractive force coefficient is C3 when the vehicle speed is V1 or less. The tractive force coefficient is C4 when the vehicle speed is V2 or greater. C4 is greater than C3. C4 may be one. Alternatively, C4 may be a value other than one. In the first coefficient data D3a, the tractive force coefficient increases in response to an increase of the vehicle speed when the vehicle speed is in a range between V1 and V2.

In the second coefficient data D3b, the tractive force coefficient is C1 when the vehicle speed is V1 or less. The tractive force coefficient is C2 when the vehicle speed is V2 or greater. C2 is greater than C1. C2 is smaller than C3. However, C2 and C3 may be the same. Alternatively, C2 may be greater than C3. In the second coefficient data D3b, the tractive force coefficient increases in response to an increase of the vehicle speed when the vehicle speed is in a range between V1 and V2.

In step S203, the controller 41 determines the target tractive force. The controller 41 determines the target tractive force by multiplying the required tractive force determined in step S201 by the tractive force coefficient. As described above, the tractive force coefficient in the second mode is smaller than the tractive force coefficient in the first mode. As a result, the target tractive force in the second mode is limited to be smaller than the target tractive force in the first mode. Consequently, the tractive force—vehicle speed characteristics L1 of the first mode and the tractive force—vehicle speed characteristics L2 of the second mode illustrated in FIG. 3 are realized. In other words, the controller 41 changes the required tractive force data to data that corresponds to the tractive force—vehicle speed characteristics L1 of the first mode by multiplying the required tractive force data by the tractive force coefficient of the first mode. The controller 41 changes the required tractive force data to data that corresponds to the tractive force—vehicle speed characteristics L2 of the second mode by multiplying the required tractive force data by the tractive force coefficient of the second mode.

In step S204, the controller 41 determines the allowable acceleration. The controller 41 determines the allowable acceleration from the control mode. The controller 41 determines a first acceleration as the allowable acceleration in the first mode. The controller 41 determines a second acceleration as the allowable acceleration in the second mode. The second acceleration is smaller than the first acceleration. Therefore, the allowable acceleration in the second mode is smaller than the allowable acceleration in the first mode.

The first acceleration and the second acceleration are, for example, fixed values. However, the first acceleration and the second acceleration may also be variables. The controller 41 may determine the first acceleration and the second acceleration based on the state of the work machine 1. The state of the work machine 1 may be, for example, a state indicating whether the work machine 1 is excavating. The controller 41 may change the second acceleration when the work machine 1 is in the excavating state from the second acceleration when the work machine 1 is in a non-excavating state. Alternatively, the controller 41 may determine the first acceleration and the second acceleration based on the vehicle speed of the work machine 1.

In step S205, the controller 41 determines a travel load. The travel load is the load on the travel drive system 20a. The controller 41 calculates the travel load from the tractive force of the travel drive system 20a, the acceleration of the work machine 1, and the weight of the work machine 1.

Figure 7:
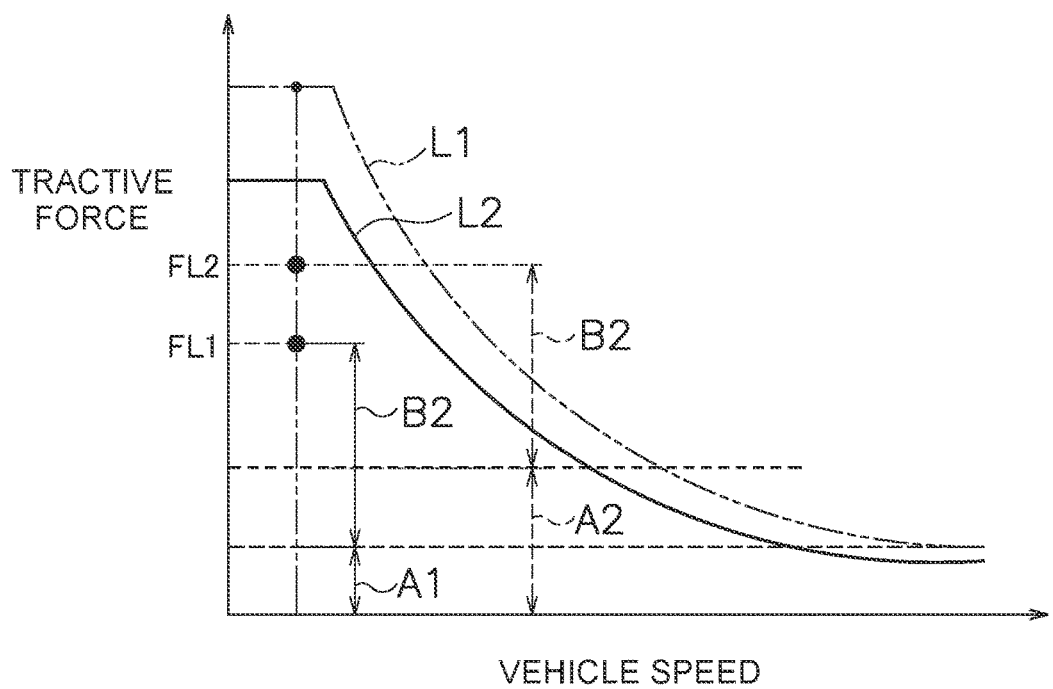
FIG. 7 illustrates an upper limit of the tractive force in a second mode.

In step S206, the controller 41 determines an upper limit of the tractive force. The controller 41 determines the upper limit of the tractive force based on the tractive force of the travel drive system 20a that corresponds to the travel load, and the tractive force of the travel drive system 20a that corresponds to the allowable acceleration. FIG. 7 illustrates an example of the upper limit of the tractive force in the second mode. In FIG. 7, A1 represents the tractive force that corresponds to the travel load when traveling on flat ground. A2 represents the tractive force that corresponds to the travel load during excavation. The travel load A2 during excavation is greater than the travel load A1 during travel on flat ground. In this way, the travel load varies in response to the state of the work machine 1.

In FIG. 7, B2 represents the tractive force of the travel drive system 20a that corresponds to the allowable acceleration in the second mode. When the tractive force corresponding to the travel load is A1, the controller 41 determines FL1, which is the sum of A1 and B2, as the upper limit of the tractive force. When the tractive force corresponding to the travel load is A2, the controller 41 determines FL2, which is the sum of A2 and B2, as the upper limit of the tractive force.

Figure 8:
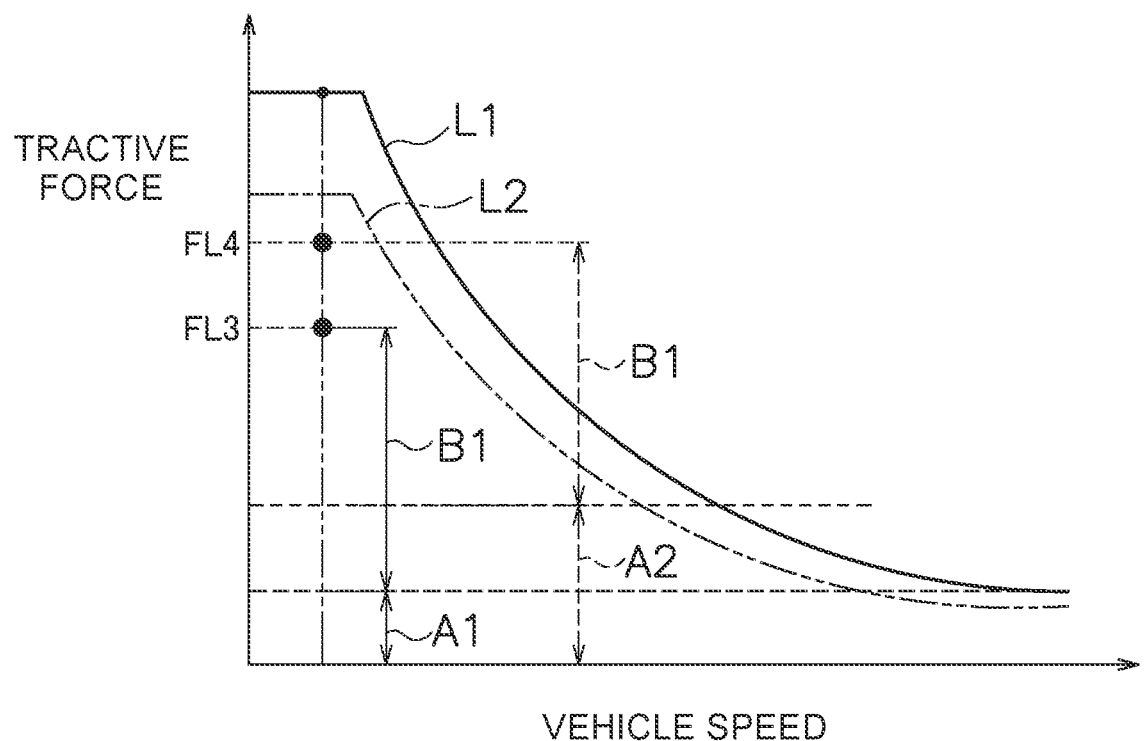
FIG. 8 illustrates an upper limit of the tractive force in a first mode.

FIG. 8 illustrates an example of the upper limit of the tractive force in the first mode. In FIG. 8, B1 represents the tractive force of the travel drive system 20a that corresponds to the allowable acceleration in the first mode. When the tractive force corresponding to the travel load is A1, the controller 41 determines FL3, which is the sum of A1 and B1, as the upper limit of the tractive force. When the tractive force corresponding to the travel load is A2, the controller 41 determines FL4, which is the sum of A2 and B1, as the upper limit of the tractive force.

In step S207, the controller 41 corrects the target tractive forte. The controller 41 corrects the target tractive force so as to be the upper limit when the value of the target tractive force determined in step S203 is greater than the upper limit of the tractive force. The controller 41 determines the value determined in step S203 as the target tractive force when the value of the target tractive force determined in step S203 is equal to or less than the upper limit of the tractive force. That is, the controller 41 does not correct the target tractive force when the value of the target tractive force determined in step S203 is equal to or less than the upper limit of the tractive force.

Figure 9:
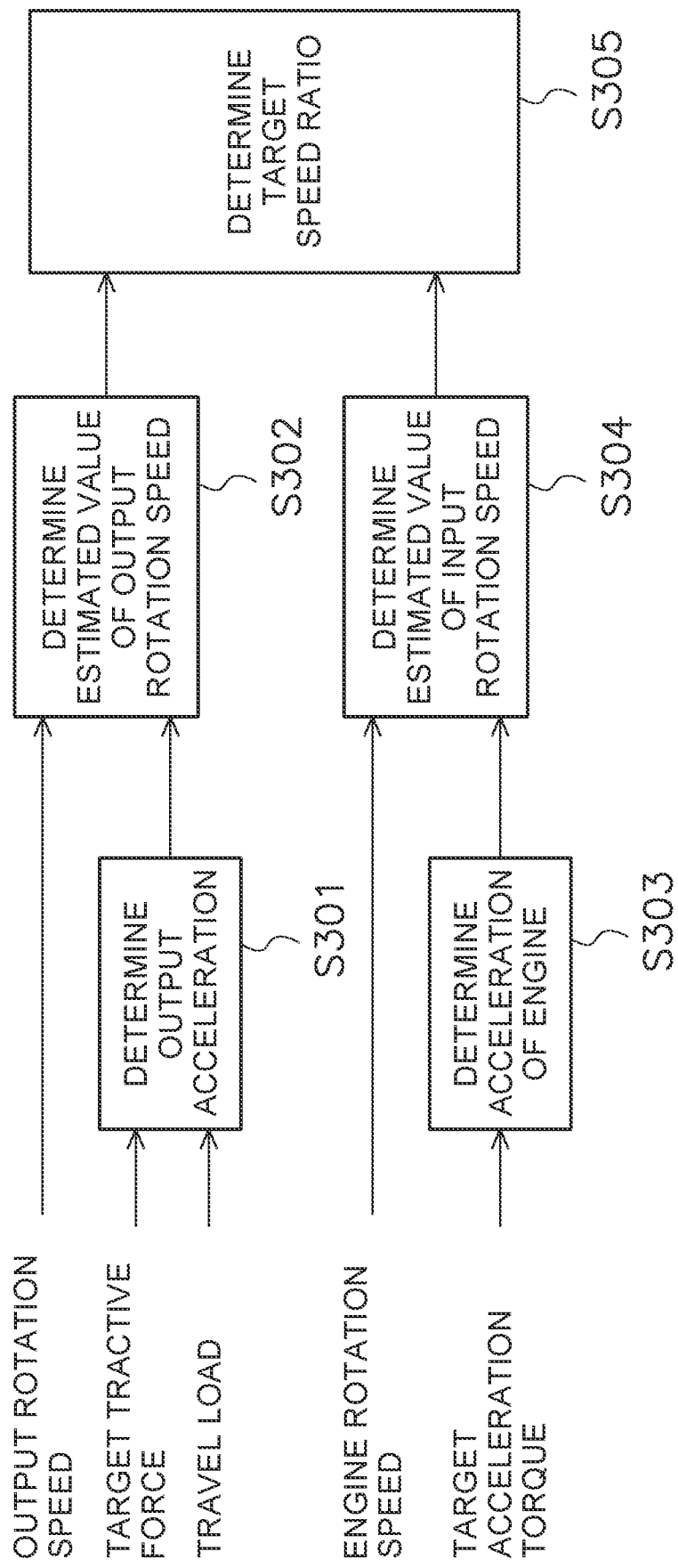
FIG. 9 is a block diagram illustrating processing for controlling the transmission.

FIG. 9 is a block diagram illustrating processing for controlling the transmission 23. The controller 41 controls the transmission gear ratio of the transmission 23 based on the target tractive force determined as described above. As illustrated in step S301 in FIG. 9, the controller 41 determines an output acceleration. The output acceleration is, for example, the acceleration of the output shaft of the transmission 23. However, the output acceleration may be the acceleration of another rotating element that is inside the transmission 23 or is positioned downstream of the transmission 23. The output acceleration includes deceleration of the output shaft of the transmission 23. For example, an output acceleration that is a negative value signifies deceleration. The controller 41 determines the output acceleration of the transmission 23 from the target tractive force and the travel load.

In step S302, the controller 41 determines an estimated value of the output rotation speed. The estimated value of the output rotation speed is a value estimated as the output rotation speed after a predetermined time period. The predetermined time period is, for example, determined from a control cycle of processing performed by the controller 41. The controller 41 determines the estimated value of the output rotation speed from the current output rotation speed and the output acceleration.

In step S303, the controller 41 determines the acceleration of the engine 21. The acceleration of the engine 21 is the acceleration of an output shaft of the engine 21. The acceleration of the engine 21 may be the acceleration of an input shaft of the transmission 23. The controller 41 determines the acceleration of the engine 21 from a target acceleration torque of the engine 21. For example, the controller 41 determines the target acceleration torque of the engine 21 from the target engine rotation speed and the current engine rotation speed.

In step S304, the controller 41 determines an estimated value of the input rotation speed. The input rotation speed is, for example, the rotation speed of an input shaft of the transmission 23. The estimated value of the input rotation speed is a value estimated as the input rotation speed after a predetermined time period. The Controller 41 determines the estimated value of the input rotation speed from the current engine rotation speed and the acceleration of the engine 21.

In step S305, the controller 41 determines a target speed ratio. The controller 41 determines the target speed ratio from the estimated value of the output rotation speed and the estimated value of the input rotation speed. The target speed ratio is a ratio of the estimated value of the output rotation speed and the estimated value of the input rotation speed.

The controller 41 determines an instruction to the transmission 23 so that the speed ratio of the transmission 23 becomes the target speed ratio. For example, when the transmission 23 is an HST, the controller 41 determines target displacements of the hydraulic pump and the hydraulic motor of the HST in accordance with the target speed ratio. When the transmission 23 is an HMT, the controller 41 determines a target torque of the hydraulic motor of the HMT in accordance with the target speed ratio in the same way as with the HST When the transmission 23 is an EMT, the controller 41 determines a target torque of the electric motor of the EMT in accordance with the target speed ratio. Consequently, the speed ratio of the transmission 23 is controlled so that the target tractive force and the target engine rotation speed are attained.

In the work machine 1 according to the present embodiment described above, when the target tractive force is greater than the upper limit, the target tractive force is corrected so as to be equal to or less than the upper limit. As a result, the required torque of the apparatus drive system 20b can be assured in comparison to when the output of the engine is limited. As a result, a reduction in workability can be suppressed. In addition, the upper limit of the tractive force of the travel drive system 20a is determined based on the allowable acceleration. As a result, the tractive force for the travel drive system 20a corresponding to the allowable acceleration can be assured. Consequently, a constant acceleration can be assured even if the travel load changes, while suppressing the generation of a large acceleration force. As a result, a reduction in travel performance can be suppressed.

Although an embodiment of the present invention has been described so far, the present invention is not limited to the above embodiment and various modifications may be made within the scope of the invention. The work machine 1 is not limited to a wheel loader and may be another machine such as a bulldozer or a motor grader:

The processing for controlling the engine 21 is not limited to the abovementioned processing and may be changed, omitted, or added to. The processing for determining the target tractive force is not limited to the abovementioned processing and may be changed, omitted, or added to. The processing for determining the allowable acceleration is not limited to the abovementioned processing and may be changed, omitted, or added to. For example, the travel load may be omitted from the determination of the allowable acceleration. The sequence of the execution of the processing is not limited to the above embodiment and may be changed. The abovementioned data D1 to D3 are not limited to the above and may be changed.

The controller 41 may change the target tractive force in response to the work state of the work machine. For example, the controller 41 may determine whether the work state of the work machine is excavating or not. The controller 41 may determine whether the work state of the work machine is excavating or not based on the operation of the work implement operating member 45, the position of the work implement, and the pressures of the hydraulic cylinders 13 and 14. The controller 41 may change the required tractive force data D2 so that the target tractive force increases more when the work state of the work machine is excavating during the second mode than when the work state of the work machine is work other than excavating. For example, the controller 41 may increase the tractive force coefficient more when the work state of the work machine is excavating during the second mode than when the work state of the work machine is the traveling state.

According to the present disclosure, a reduction in workability and travel performance can be suppressed while suppressing the generation of an excessive acceleration force in a work machine.

The invention claimed is:

1. A work machine comprising:
an engine;
a travel drive system including a transmission connected to the engine;
a work implement;
an apparatus drive system including a hydraulic pump that is driven by the engine and discharges hydraulic fluid to be supplied to the work implement;
an accelerator operating member that receives an accelerator operation by an operator;
a work implement operating member that receives a work implement operation by the operator; and
a controller configured to
control the apparatus drive system in accordance with an operating amount of the work implement operating member,
determine a target tractive force of the travel drive system based on an operating amount of the accelerator operating member,
determine an allowable acceleration of the work machine,
determine an upper limit of tractive force of the travel drive system based on the allowable acceleration,
correct the target tractive force so as to be equal to or less than the upper limit of tractive force when the target tractive force is greater than the upper limit of tractive force, and
control the travel drive system based on the corrected target tractive force.

2. The work machine according to claim 1, wherein
the controller is further configured to:
acquire a load of the travel drive system, and
change the upper limit of tractive force in response to the load of the travel drive system.

3. The work machine according to claim 1, wherein
the controller is further configured to determine the upper limit of tractive force based on
a tractive force corresponding to a load of the travel drive system, and
a tractive force corresponding to the allowable acceleration.

4. The work machine according to claim 1, wherein
the controller is further configured to selectively execute a first mode and a second mode that limits the tractive force of the travel drive system more than the first mode, and
the allowable acceleration of the second mode is smaller than the allowable acceleration of the first mode.

5. The work machine according to claim 4, wherein
the controller is further configured to
store required tractive force data that prescribes a relationship between a vehicle speed, the operating amount of the accelerator operating member, and a required tractive force of the travel drive system,
refer to the required tractive force data and determine the required tractive force from the vehicle speed,
determine the target tractive force from the required tractive force, and
change the required tractive force data in response to the mode selected from the first mode and the second mode.

6. The work machine according to claim 5, wherein the controller is further configured to
- determine whether a work state of the work machine is excavating, and
- change the required tractive force data so that the required tractive force increases more when the work state of the work machine during the second mode is the excavating than when the work state of the work machine is work other than excavating.

7. The work machine according to claim 1, wherein the controller is further configured to determine the allowable acceleration based on a state of the work machine.

8. The work machine according to claim 7, wherein the state of the work machine is excavating.

9. The work machine according to claim 1, wherein the controller is further configured to
- determine a required torque of the apparatus drive system based on the operating amount of the work implement operating member, and
- control an output of the engine based on the target tractive force of the travel drive system and the required torque of the apparatus drive system.

10. The work machine according to claim 1, further comprising:
- a front vehicle body; and
- a rear vehicle body connected to the front vehicle body so as to allow turning to the left and right,
- the travel drive system further including
  - a front wheel provided to the front vehicle body, and
  - a rear wheel provided to the rear vehicle body.

11. A control method for a work machine including an engine, a travel drive system including a transmission connected to the engine, a work implement, and an apparatus drive system including a hydraulic pump that is driven by the engine and discharges hydraulic fluid to be supplied to the work implement, the control method comprising:
- acquiring an operating amount of a work implement operating member;
- controlling the apparatus drive system in accordance with the operating amount of the work implement operating member;
- acquiring an operating amount of an accelerator operating member;
- determining a target tractive force of the travel drive system based on the operating amount of the accelerator operating member;
- determining an allowable acceleration of the work machine;
- determining an upper limit of tractive force of the travel drive system based on the allowable acceleration;
- correcting the target tractive force so as to be equal to or less than the upper limit of tractive force when the target tractive force is greater than the upper limit of tractive force; and
- controlling the travel drive system based on the corrected target tractive force.

* * * * *